United States Patent
Whitby-Strevens

(12) 
(10) Patent No.: US 6,718,497 B1
(45) Date of Patent: Apr. 6, 2004

(54) METHOD AND APPARATUS FOR GENERATING JITTER TEST PATTERNS ON A HIGH PERFORMANCE SERIAL BUS

(75) Inventor: Colin Whitby-Strevens, Bristol (GB)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/557,071

(22) Filed: Apr. 21, 2000

(51) Int. Cl.$^7$ .......................... G01R 31/28; G06F 11/00

(52) U.S. Cl. .................. 714/739; 714/49; 714/821; 370/241

(58) Field of Search ................... 714/736, 821, 714/738–739, 744, 49, 47; 703/26; 331/18; 370/516, 250–253, 389, 395.1, 538, 241, 242, 398, 401; 327/163, 149, 153, 234, 296, 563; 375/257; 710/8, 10, 15, 306, 311, 104, 109, 303, 315; 709/222; 713/400, 600

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhar | 370/16 |

(List continued on next page.)

OTHER PUBLICATIONS

Bregni et al. "Jitter testing technique and results at VC–4 desynchronizer output of SDH equipment; IEEE Transactions on Instrumentation and Measurement, vol. 44, Iss. 3; pp. 675–678; Jun. 1995".*

Shiwen et al. Parallel positive justification in SDH C–4 mapping; IEEE International Conference on Communications, vol. 3, pp. 1577–1581; Jun. 12, 1997.*

Bregni et al. "Jitter testing technique and results at VC–4 desynchronizer output of SDH equipment; IEEE International Conference on Communicatons, vol. 3, pp. 1407–1410; May 12, 1994".*

"IEEE Standard for a High Performance Serial Bus", IEEE Standard 1394–1995, Institute of Electrical and Electronics Engineers, Inc., Aug. 30, 1996.

"IEEE Standard for a High Performance Serial Bus–Amendment 1", Institute of Electrical and Electronics Engineers, Inc., pp. 1–196, 2000 (no month).

P1394b IEEE Draft Standard for a High Performance Serial Bus (High Speed Supplement), Institute of Electrical and Electronics Engineers, Inc., pp. 1–408, 2002 (no month).

"AV/C Digital Interface Command Set General Specification, Rev. 3.0", 1394 Trade Association, pp. 4–5, 20–34, Apr, 15, 1998.

"Enhancements to the AV/C General Specification 3.0 Version 1.0FC1", 1394 Trade Association, pp. 4,6–17, Nov. 5, 1998.

"Fibre Channel–Methodologies for Jitter Specification", NCITS TR–25–1999, Jitter Working Group Technical Report, Rev. 10, pp. 1–96, Jun. 9, 1999.

*Primary Examiner*—Guy J. Lamarre
(74) *Attorney, Agent, or Firm*—Sierra Patent Group, Ltd.

(57) ABSTRACT

The present invention provides a method for generating random jitter test patterns by generating a sequence of maximum-size asynchronous packets according to the P1394b standard and transmitting the sequence to the device under test. The present invention provides a method for generating jitter test patterns by disabling the transmitter data scrambler of the second device; clearing the port_error register of the device under test; and sending a test pattern to said device under test. The present invention provides for a method for generating supply noise test patterns comprising: transmitting a test pattern to the DUT comprising a maximum length asynchronous packet containing alternate 0016 and FF16 bytes.

11 Claims, 5 Drawing Sheets

Random Jitter Test Pattern
According to the Present Invention

U.S. PATENT DOCUMENTS

| Patent No. | | Date | Inventor | Class |
|---|---|---|---|---|
| 5,274,631 | A | 12/1993 | Bhardwaj | 370/60 |
| 5,343,461 | A | 8/1994 | Barton et al. | 370/13 |
| 5,394,556 | A | 2/1995 | Oprescu | 395/800 |
| 5,452,330 | A | 9/1995 | Goldstein | 375/257 |
| 5,490,250 | A * | 2/1996 | Reschke et al. | 714/49 |
| 5,490,253 | A | 2/1996 | Laha et al. | 395/304 |
| 5,495,481 | A | 2/1996 | Duckwall | 370/85.2 |
| 5,539,390 | A | 7/1996 | Nagano et al. | 340/825.07 |
| 5,541,670 | A | 7/1996 | Hanai | 348/705 |
| 5,568,641 | A | 10/1996 | Nelson | 395/700 |
| 5,583,922 | A | 12/1996 | Davis et al. | 379/93.09 |
| 5,621,659 | A | 4/1997 | Matsumoto et al. | 364/514 R |
| 5,630,173 | A | 5/1997 | Oprescu | 395/860 |
| 5,640,595 | A | 6/1997 | Baugher et al. | 395/830 |
| 5,654,657 | A * | 8/1997 | Pearce | 327/163 |
| 5,684,715 | A | 11/1997 | Palmer | 365/514 |
| 5,701,476 | A | 12/1997 | Fenger | 395/652 |
| 5,701,492 | A | 12/1997 | Wadsworth et al. | 395/712 |
| 5,712,834 | A | 1/1998 | Nagano et al. | 369/19 |
| 5,719,862 | A | 2/1998 | Lee et al. | 370/355 |
| 5,784,648 | A | 7/1998 | Duckwall | 395/860 |
| 5,802,048 | A | 9/1998 | Duckwall | 370/389 |
| 5,802,057 | A | 9/1998 | Duckwall et al. | 370/408 |
| 5,805,073 | A | 9/1998 | Nagano et al. | 340/825.07 |
| 5,809,331 | A | 9/1998 | Staats et al. | 395/830 |
| 5,832,298 | A | 11/1998 | Sanchez et al. | 395/828 |
| 5,835,761 | A | 11/1998 | Ishii et al. | 395/653 |
| 5,867,730 | A | 2/1999 | Leyda | 395/830 |
| 5,875,301 | A | 2/1999 | Duckwall et al. | 395/200.51 |
| 5,938,764 | A | 8/1999 | Klein | 713/1 |
| 5,968,152 | A | 10/1999 | Staats | 710/104 |
| 5,970,052 | A | 10/1999 | Lo et al. | 370/241 |
| 5,987,605 | A | 11/1999 | Hill et al. | 713/2 |
| 6,032,202 | A | 2/2000 | Lea et al. | 710/8 |
| 6,032,261 | A * | 2/2000 | Hulyalkar | 713/400 |
| 6,038,625 | A | 3/2000 | Ogino et al. | 710/104 |
| 6,070,187 | A | 5/2000 | Subramaniam et al. | 709/220 |
| 6,073,206 | A | 6/2000 | Piwonka et al. | 711/102 |
| 6,122,248 | A | 9/2000 | Murakoshi et al. | 370/216 |
| 6,131,129 | A | 10/2000 | Ludtke | 710/5 |
| 6,133,938 | A | 10/2000 | James | 348/8 |
| 6,138,196 | A | 10/2000 | Takayama et al. | 710/105 |
| 6,141,702 | A | 10/2000 | Ludtke et al. | 710/5 |
| 6,141,767 | A | 10/2000 | Hu et al. | 714/1 |
| 6,157,972 | A | 12/2000 | Newman et al. | 710/100 |
| 6,160,796 | A | 12/2000 | Zou et al. | 370/257 |
| 6,167,532 | A | 12/2000 | Wiseccup | 713/300 |
| 6,173,327 | B1 | 1/2001 | De Borst et al. | 709/231 |
| 6,192,189 | B1 | 2/2001 | Fujinami et al. | 386/96 |
| 6,202,210 | B1 | 3/2001 | Ludtke | 725/20 |
| 6,233,615 | B1 | 5/2001 | Van Loo | 709/224 |
| 6,233,624 | B1 | 5/2001 | Hyder et al. | 709/327 |
| 6,247,083 | B1 | 6/2001 | Hake et al. | 710/107 |
| 6,253,114 | B1 | 6/2001 | Takihara | 700/83 |
| 6,253,255 | B1 | 6/2001 | Hyder et al. | 709/321 |
| 6,260,063 | B1 | 7/2001 | Ludtke et al. | 709/224 |
| 6,266,334 | B1 | 7/2001 | Duckwall | 370/397 |
| 6,266,701 | B1 | 7/2001 | Sridhar et al. | 709/232 |
| 6,282,597 | B1 | 8/2001 | Kawamura | 710/105 |
| 6,295,479 | B1 | 9/2001 | Shima et al. | 700/83 |
| 6,308,222 | B1 | 10/2001 | Krueger et al. | 709/247 |
| 6,311,228 | B1 | 10/2001 | Ray | 709/301 |
| 6,345,315 | B1 | 2/2002 | Mishra | 709/329 |
| 6,353,868 | B1 | 3/2002 | Takayama et al. | 710/129 |
| 6,385,679 | B1 | 5/2002 | Duckwall et al. | 710/119 |
| 6,426,962 | B1 * | 7/2002 | Cabezas et al. | 370/516 |
| 6,452,975 | B1 * | 9/2002 | Hannah | 375/257 |
| 6,519,657 | B1 * | 2/2003 | Stone et al. | 710/10 |

* cited by examiner

Present Invention

Jitter Tolerance Pattern
According to the Present Invention

Supply Noise Pattern
According to the Present Invention

METHOD AND APPARATUS FOR GENERATING JITTER TEST PATTERNS ON A HIGH PERFORMANCE SERIAL BUS

BACKGROUND OF THE INVENTION

1. Field of the Invention

The present invention relates to data communications. In particular, the present invention relates to generating jitter test patterns on a high performance serial bus system.

2. The Prior Art

Background

The effect of jitter on the transmission of electrical signals is known in the art. Jitter is generally defined as the deviation of a signal edge from its ideal position. Jitter is generally introduced by the electrical properties of the transmitting device and the transmission medium. For example, long runs of cable add jitter as they affect the rise and fall times and amplitude of a signal due to the time constants created by the additional capacitance inherent in a long run of cable.

Furthermore, jitter can be dependent upon the type of signal being transported. For example, a long string of zeros followed by a single one can cause problems because charging a long run of cable is difficult in such a short amount of time. Likewise, a long string of ones followed by a single zero can also cause problems because of the difficulty in discharging a long run of cable in such a short period of time. The longer run length produces a higher amplitude which takes more time to overcome when changing bit values and therefore produces a time difference compared to the run length of a 1 bit sequence. When different run lengths are mixed in the same transmission the different bit sequences (symbols) therefore interfere with each other. This effect is known as intersymbol interference (ISI). ISI is expected whenever any bit sequence has frequency components that are propagated at different rates by the transmission media.

Thus, for any communications system to operate effectively, the transmitter and transmission medium must limit the jitter introduced into the signal, and receiver must be able to tolerate any permitted jitter introduced into the signal. The presence of jitter complicates the design of receiver circuits which are required to use clock recovery techniques, for example Phase Locked Loops (PLL) or Delay Locked Loops (DLL). Such circuits are often found to be particularly sensitive to the frequency of the jitter. The frequency of the jitter is a property of the frequency of the repeat patterns in the data being transmitted combined with the effects of ISI and other sources of jitter.

Attempts have been made in the prior art to characterize jitter and generate jitter test patterns which correspond the worst-case scenario that a receiver might face. Communications equipment can then be subjected to the jitter test patterns to examine the communications equipment's susceptibility to jitter effects. The results may then be plotted for analysis.

FIG. 1 shows a prior art jitter diagram known in the art as an eye diagram. The eye diagram of FIG. 1 is typically displayed on an oscilloscope with a storage facility to store and display a large number of signals simultaneously or a communications analyzer, with the vertical axis representing voltage, and the horizontal axis representing time.

The eye diagram of FIG. 1 includes a low potential level 100 ("low") and a high potential level 102 ("high") which correspond to the absolute value of a logical low and high state, respectively. A threshold 104 is defined on the eye diagram of FIG. 1. Threshold 104 corresponds to the voltage level above which a receiving device will sense a logical high, and below which a device will sense a logical low.

FIG. 1 further includes a crossing 0 (106) and a crossing 1 (108). Crossings 0 and 1 define the left and rightmost boundaries of bit window 110, respectively. As is appreciated by those of ordinary skill in the art, it is desirable that all transitions should occur outside of the bit window 110. In actual practice, the effect of jitter is that the transitions may occur at a variety of times, as shown by transitions 1 . . . N (107). However, as long as the transitions do not encroach on the bit window 110, the receiving device will be able to accurately decode the information.

As is known by those of ordinary skill in the art, jitter is indicated by distributed transitions (crossings) of the threshold as the data toggles between logic states. Using equipment standard in the art such as a time interval analyzer (TIA), histograms of transition regions can be taken at the threshold level. The width of the histograms can then be estimated using methods and algorithms standard in the art, including standard deviation, etc.

One area that is impacted by jitter effects is high performance serial buses. One such bus protocol is the IEEE 1394-1995 standard. This standard revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

The IEEE 1394-1995 standard was not greatly impacted by jitter effects, however, because of the relatively short cable lengths (about 3 meters, maximum) utilized by the standard and the transmission of a clock reference by use of Data-Strobe encoding.

However, as technologies improved, the need to update the IEEE 1394-1995 standard became apparent. A new standard is being proposed at the time of the filing of this application, herein referred to as the P1394b standard. Improvements such as higher speeds and longer connection paths will be provided. It is contemplated at the time of this filing that cable lengths exceeding 100 meters may be possible using the P1394b standard. In addition, the use of Data Strobe encoding is impractical at these higher frequencies and cable lengths, and so P1394b requires receivers to use clock recovery techniques by analyzing the timing of the data edges of the incoming signal. Accordingly, it is possible that systems operating under the P1394b standard may be susceptible to jitter effects.

In the discussion that follows, it will be necessary to distinguish between the various standards that are being proposed as of the date of this application. Thus, the term "Legacy" will be used herein to refer to the IEEE 1394-1995 standard and all supplements thereof prior to the P1394b standard. Thus, for example, a Legacy node refers to a node compatible with the IEEE 1394-1995 standard and all supplements thereof up to, but not including, the P1394b standard.

As mentioned above, the Legacy standard was not greatly impacted by jitter effects. This is evidenced by a very simple jitter specification and lack of jitter test patterns (for example, to take into account the effect of ISI) in the Legacy standard as adopted. However, because of the performance increases in both speed and run length and the need to use clock recovery techniques, implementations of the P1394b standard may be susceptible to jitter effects.

Hence, there is a need for a system for measuring and determining the effects of jitter upon devices compliant with the P1394b standard. Furthermore, there is a need for a method for generating jitter test patterns within the P1394b environment.

Other industries have also attempted to measure and characterize jitter effects. One such industry is the fiber optics industry, and in particular, the Fibre Channel (FC) link used within the fiber optics industry. The various manufacturers of Fibre Channel-compliant hardware have produced a document entitled "Methodologies for Jitter Specification, Draft Proposed Technical Report, Secretariat National Committee for Information Technology Standardization (NCITS)", hereinafter "MJS". MJS is an ANSI technical report on the definitions, measurement requirements, and allowed values of jitter on a 1.0625 GBaud Fibre Channel link.

The results of the MJS provide an excellent framework to begin developing jitter test patterns. For example, for the Fibre Channel jitter tolerance test contained in the MJS, the following assumptions were made: 1) the average FC traffic transition density is approximately 50%; 2) the CDR time constant is inversely proportional to transition density; 3) to obtain at least 95% settling a pattern duration needs to be greater than 3 time constants 4) The PLL's minimum bandwidth for FC transceivers is 637 kHz.

However, the test patterns recommended in the MJS are specific to the Fibre Channel encoding and frame format, as can be seen from the FC-specific assumptions laid out above. As such, these assumptions were made in the MJS that are specific to the hardware and software used in the Fibre Channel media. Thus, while the goals of the MJS are desirable, the solutions provided in the MJS cannot be implemented in the P1394b standard because of the differences in encoding and frame format between the two industries.

BRIEF DESCRIPTION OF THE INVENTION

The invention satisfies the above needs. The present invention relates to data communications. In particular, the present invention relates to generating jitter test patterns on a high performance serial bus system.

Jitter pattern tests and protocols are disclosed herein which may be generated by test software, but run on a normal P1394b node with no special hardware modification or test modes.

A first aspect of the present invention provides a method for generating random jitter test patterns comprising generating a sequence of maximum size asynchronous packets according to the P1394b standard and transmitting the sequence to the device under test. Other embodiments of the first aspect include a test sequence which comprises CURRENT_ASYNC requests, ignoring fairness; and where the sequence comprises a packet payload containing all zeros.

A second aspect of the present invention provides for a method for generating jitter test patterns comprising disabling the transmitter data scrambler of the second device; clearing the port_error register of the device under test; and sending a test pattern to said device under test.

Further embodiments of the second aspect of the present invention provide that the error rate of a jitter test may be computed by reading the port_error register. Further embodiments of the test pattern comprise a sequence of at least 42 null packets followed by a packet containing at least 50 bytes of consecutive D21.5 symbols having an 8 bit data value AD16, and where the sequence is generated by repeatedly issuing CURRENT_ASYNC requests and providing a zero length PHY packet.

A third aspect of the present invention provides for a method for generating supply noise test patterns comprising transmitting a test pattern to the DUT comprising a maximum length asynchronous packet containing alternate 0016 and FF16 bytes.

A fourth aspect of the present invention provides for a method for generating supply noise test patterns comprising transmitting data across a system bus electrically proximate to the device under test and the second device, said data alternating between all ones and all zeros on successive clocks.

BRIEF DESCRIPTION OF THE DRAWING FIGURES

DETAILED DESCRIPTION OF PREFERRED EMBODIMENTS

Figure 1:
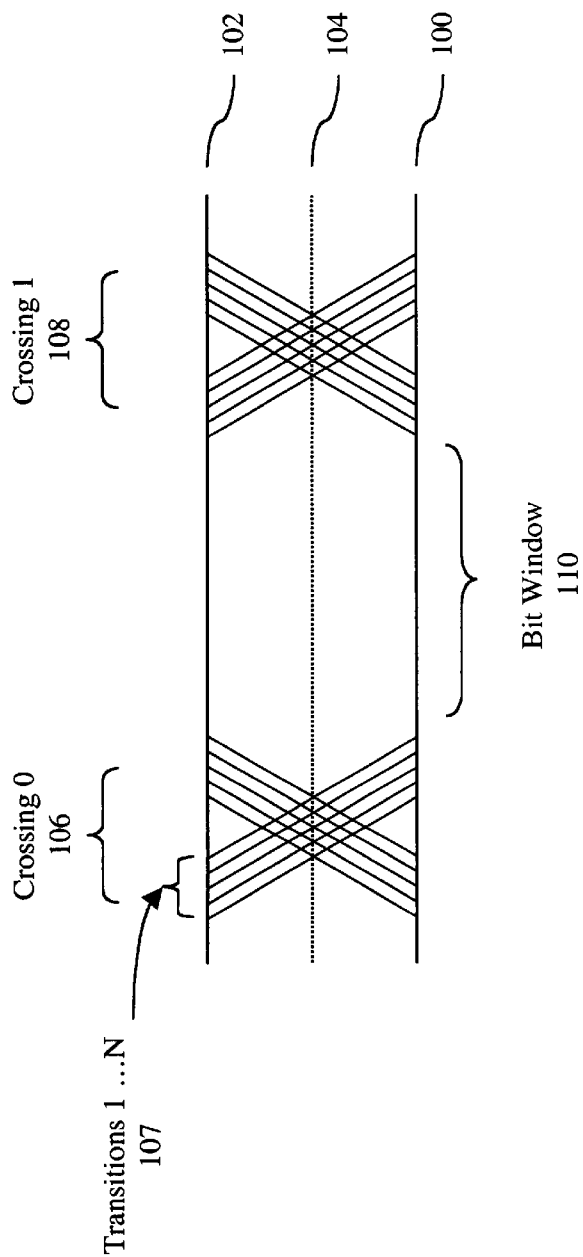
FIG. 1 is a prior art jitter diagram.

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. More particularly, the present invention relates to a method and apparatus for an arbitration and fairness protocol on a serial bus. The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention relates to data structures and the transmission of such data structures. It is contemplated that the present invention may by embodied in various computer and machine readable data structure. Furthermore, it is contemplated that data structures embodying the present invention will be transmitted across computer and machine readable media.

The present invention may be described through the use of flowcharts. Often, a single instance of an embodiment of the present invention will be shown. As is appreciated by those of ordinary skill in the art, however, the protocols and procedures described herein may be repeated continuously or as often as necessary to satisfy the needs described herein. Accordingly, the representation of the present invention through the use of flowcharts should not be used to limit the scope of the present invention.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation were one node corresponds to one device.

Each node may communicate to other nodes in an P1394b-compatible system though links. Typically, a cable is used for a link, as is provided for in the P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

Test Setup

Figure 2:
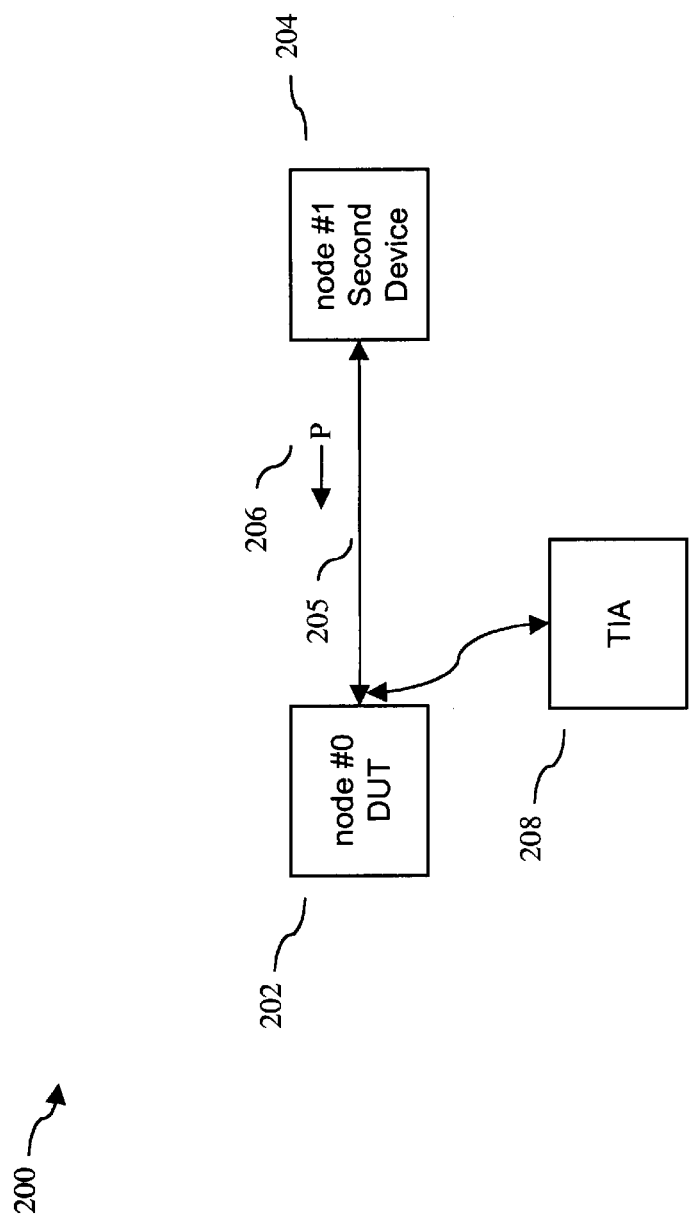
FIG. 2 is a block diagram of a test configuration according to the present invention.

FIG. 2 shows a test configuration 200 according to the present invention.

Test configuration 200 includes device under test (DUT) 202 operatively coupled to a second device 204 to provide a P1394b-compliant bus 205. In a preferred embodiment of the present invention, DUT 202 may have a plurality of ports, and in such a case each port on DUT 202 is tested independently. The port used on the second device 204 utilized for the test of the present invention should be capable of operating at the maximum operating speed of the port under test on the device under test 202. In the case of jitter tolerance tests, the second device 204 will generate the test pattern as described below.

FIG. 2 further shows second device 204 sending a test packet 206 to DUT 202. In a preferred embodiment of the present invention, the packet format used is a compliant asynchronous packet (with normal header and checksum). In a further preferred embodiment, the packets are addressed to node 2. As will be appreciated by those of ordinary skill in the art, the packets, even when not scrambled, will be ignored by the receiving node's link layer.

The test configuration 200 may further include an extra circuitry and/or test equipment appropriate to the test method being used. For example, the test configuration 200 may include a time interval analyzer (TIA) 208 operatively coupled to capture test packets and provide results of tests according to the present invention.

Test Patterns

It is contemplated that three types of test patterns may be employed in the present invention: a random pattern, a receive jitter tolerance pattern, and a supply noise pattern. It is further contemplated that the tests disclosed herein may be generated by test software, but run on a normal P1394b node with no special hardware modification or test modes, apart from the required ability to disable the transmit scrambler during packet payload transmission, as will be disclosed below.

Random Pattern

As is appreciated by those of ordinary skill in the art, the P1394b standard utilizes a scrambler when transmitting data to minimize RF emissions. This capability provides an excellent in-built random pattern generator to be utilized in the present invention.

Figure 3:
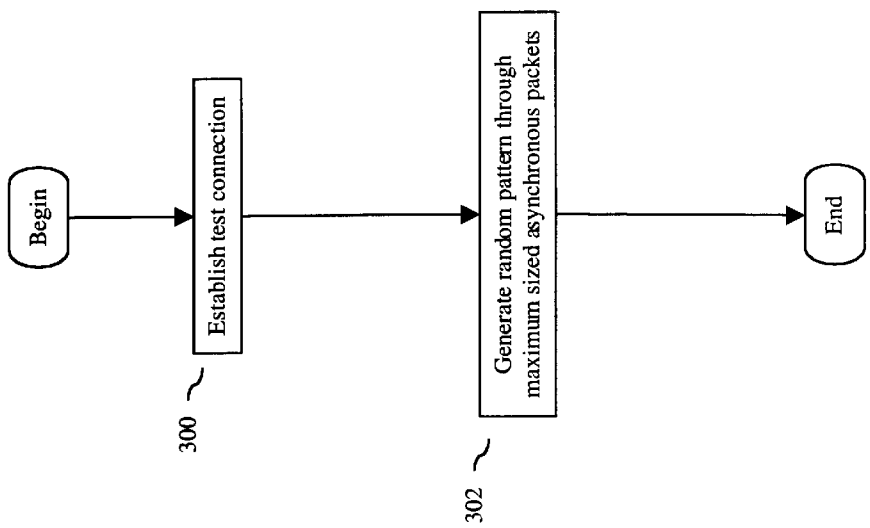
FIG. 3 is flowchart of a random jitter test pattern according to the present invention.

FIG. 3 is a flowchart for a random pattern test according to the present invention. The test begins in act 300 with a test configuration being established which provides a P1394b compliant bus. In a preferred embodiment of the present invention, this may be accomplished by means of the test configuration of FIG. 2.

Next, in act 302, a random pattern is generated through a repeated sequence of maximum size asynchronous packets according to the P1394b standard. As is appreciated by those of ordinary skill in the art, the packets may depend on the transmission speed of the bus.

As disclosed in FIG. 2, a TIA may be primed to capture each packet, and the test results examined to determine the effects of jitter on the transmitted data. The test of FIG. 3 may be repeated as often as needed to achieve the desired results.

In an exemplary non-limiting embodiment of the present invention, the packets of act 302 are transmitted continuously. This may be accomplished by way by using CURRENT_ASYNC requests for example, ignoring fairness. In a further non-limiting embodiment, the packet payload may be all zeros, which will then be scrambled by the transmitting PHY into a random pattern suitable for use with the present invention.

Jitter Tolerance Pattern

As mentioned in the above, it is critical in testing for jitter effects that the worst-case scenario be tested to assure compliance. One such worst-case scenario is a string of zeros followed by a string of ones. The following test pattern tests for this scenario by providing a sequence of symbols having a low density pattern followed by a sequence of symbols having a high density pattern. Using these two patterns together tests the tolerance to phase jumps caused by systematic pattern jitter. It is contemplated that the run length of these two patterns may be related to the time constants of the PLL.

As mentioned in above, it may be desirable to utilize certain assumptions made in the MJS. In an exemplary non-limiting embodiment of the present invention, 100 10 bit characters at 50% transition density meets these assumptions. For Fibre Channel, the repeating D21.5 character is used as it has a 100% transition density and the repeating D30.3 character is used as it has a 30% transition density.

Because of the above assumptions, in the present invention the duration of the high transition density pattern should be at least 50 10 bit characters on a P1394b-compliant bus. As for the low transition density pattern, it should be at least 167 10 bit characters on a P1394b-complaint bus.

Figure 4:
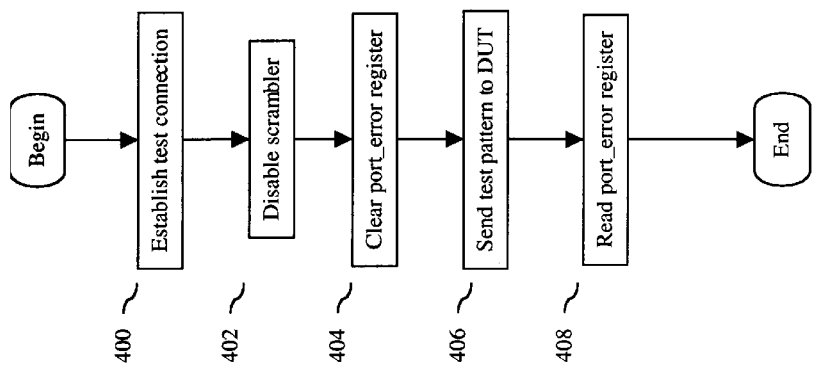
FIG. 4 is flowchart of a jitter tolerance pattern according to the present invention.

FIG. 4 is a flowchart for a jitter tolerance pattern according to the present invention.

As mentioned above, the P1394b standard utilizes a scrambler when sending data over a bus. Thus, in the case of P1394b, the control symbols provide approximately a 30% transition density when scrambled. However, the scrambled data characters will provide only 50%. If the transmit scrambler is disabled, then 100% transition density can be achieved by using D21.5 symbols.

The jitter test of FIG. 4 begins in act 400 with a P1394b-compliant test configuration being established. This act may be accomplished by way of the test connection as disclosed in FIG. 2. Once synchronization has been established, the transmitter data scrambler is disabled in act 402.

Next, in act 404, the port_error register of the receive port is read in order to clear it. It is contemplated that the error rate of the present test may be computed from the values obtained by reading the port_error register.

Then, in act 406, a test pattern is sent to the DUT by the second device. It is contemplated that this act may be repeated as often as necessary to achieve the desired test results.

Finally, in act 408, the port_error register is read to see if any errors occurred during the test.

In an exemplary non-limiting embodiment of the present invention, the test pattern comprises a sequence of at least 42 null packets followed by a packet containing at least 50 bytes of consecutive D21.5 symbols (8 bit data value $AD_{16}$). This pattern (42 null packets followed by a packet with D21.5 data) may repeated indefinitely to achieve desired results.

In a presently preferred embodiment, the sequence of 42 null packets may be generated by repeatedly issuing CURRENT_ASYNC requests and providing a zero length PHY packet. As is appreciated by those of ordinary skill in the art, this results in generating a repeating sequence of DATA_PREFIX-DATA_PREFIX-DATA_END-DATA_END packets.

As is further appreciated by those of ordinary skill in the art, in the P1394b standard it is not required that link devices support the transmission of zero length null packets. To compensate for this contingency, an acceptable alternative for the present invention is to transmit single quadlet or two quadlet PHY packets containing the repeated data byte D30.3 (8 bit data value 0x7E). In a preferred embodiment of the present invention, the total length of this part of the test pattern, comprising the repeated PHY packets, should be at least 167 symbols.

It is contemplated that the length of the two parts of the test pattern may need adjustment according to the cut-off frequency of the receiver PLL, particularly for transmission at speeds other than S800. Acceptable adjustments may be made by following the guidelines given above or by following the test guidelines given in the MJS report.

For best results when measuring output jitter according to the present invention, a TIA should be armed to start at the beginning of a packet, and to capture the transitions for the duration of one period of the repeating cycle. For this purposes of the present invention, it is sufficient to arm the TIA to start on a sequence of 5 zeros or 5 ones, which will capture between 80% and 90% of all packets.

Supply Noise Pattern

As mentioned above, one type of jitter effect that should be characterized is jitter induced in systems having parallel interfaces. P1394b is one such system. The aim of this test sequence is to maximize supply noise by changing all lines on a parallel PHY/Link interface.

Figure 5:
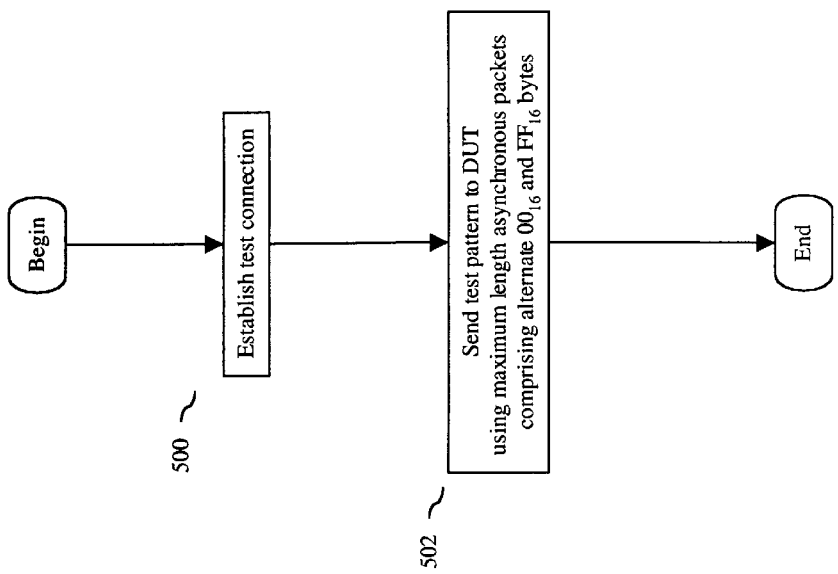
FIG. 5 is flowchart of a supply noise pattern according to the present invention.

FIG. 5 is a flowchart for a supply noise test according to the present invention. The jitter test of FIG. 5 begins in act 500 with a P1394b-compliant test configuration being established. This act may be accomplished by way of the test connection as disclosed in FIG. 2. It is contemplated that the transmitter data scrambler is enabled in the present test.

In act 502, the test pattern is transmitted by the second device to the DUT. In an exemplary non-limiting embodiment of the present invention, the test pattern comprises a maximum length asynchronous packet containing alternate $00_{16}$ and $FF_{16}$ bytes. It is contemplated the test pattern may be transmitted as often as necessary to achieve the desired results.

If there is no parallel PHY/Link interface, or a serial PHY/Link interface is used, then a system dependent method of maximizing supply noise should be used for the present test, for example by transmitting data across an electrically proximate system bus which alternates between all ones and all zeros on successive clocks.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a P1394b-compliant data communications system having a device under test operatively coupled to second device, a method for generating random jitter test patterns comprising:

generating, by the second device, a sequence of maximum size asynchronous packets according to the P1394b standard; and transmitting, by said second device, said sequence to the device under test.

2. The method of claim 1 wherein said sequence comprises CURRENT_ASYNC requests, ignoring fairness.

3. The method of claim 1, wherein said sequence comprises a packet payload containing all zeros.

4. In a P1394b-compliant data communications system having a device under test operatively coupled to second device, the device under test having a port_error register and the second device having a data scrambler, a method for generating jitter test patterns comprising:

disabling the transmitter data scrambler of the second device;

clearing the port_error register of the device under test;

sending, by said second device, a test pattern to said device under test; and reading the port_error register of the device under test.

5. The method of claim 4, wherein the error rate of a jitter test is determined by reading the port_error register.

6. The method of claim 4, wherein said test pattern comprises a sequence of at least 42 null packets followed by a packet containing at least 50 bytes of consecutive D21.5 symbols having an 8 bit data value $AD_{16}$.

7. The method of claim 6, wherein said sequence of at least 42 null packets is generated by repeatedly issuing CURRENT_ASYNC requests and providing a zero length PHY packet.

8. The method of claim 4, wherein said test pattern comprises a single quadlet PHY packet containing the repeated data byte D30.3 having an 8 bit data value 0x7E.

9. The method of claim 8, wherein the total length of said test pattern is at least 167 symbols.

10. The method of claim 4, wherein said test pattern comprises two quadlet PHY packets containing the repeated data byte D30.3 having an 8 bit data value 0x7E.

11. The method of claim 10, wherein the total length of said test pattern is at least 167 symbols.

* * * * *